Jan. 9, 1968 D. F. T. DUNSTER 3,362,851
NICKEL-GOLD CONTACTS FOR SEMICONDUCTORS
Filed July 20, 1964
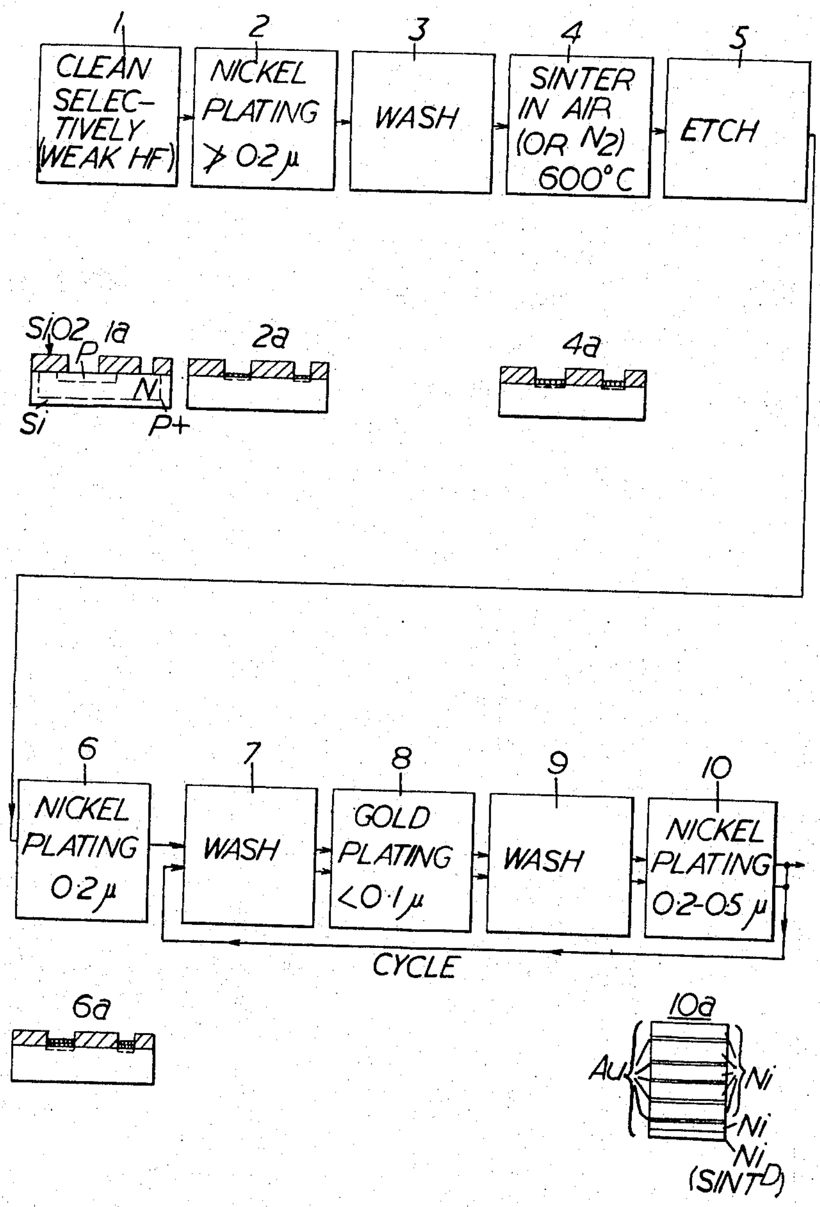
Inventor
DAVE F. T. DUNSTER
By [signature]
Attorney United States Patent Office 3,362,851

Patented Jan. 9, 1968

3,362,851

NICKEL-GOLD CONTACTS FOR SEMICONDUCTORS

Dave Francis Thomas Dunster, London, England, assignor to International Standard Electric Corporation, New York, N.Y., a corporation of Delaware Filed July 20, 1964, Ser. No. 383,753
Claims priority, application Great Britain, Aug. 1, 1963, 30,558/63
11 Claims. (Cl. 117—212)

ABSTRACT OF THE DISCLOSURE

This invention provides an improved method of electroless metal plating which is accomplished by building up a plurality of layers consisting of two metals, namely nickel and gold, successively applied to obtain the desired thickness.

This invention relates to metal plated contacts on insulators with particular reference to contacts applied by the so-called "electroless" method. The invention is particularly of use in the processing of semi-conductors.

Many methods are known for depositing metallic contacts on to areas of insulating materials and the like, for example, semiconductors, and such methods include electrolytic plating, electroless plating and evaporation. In all such methods, there is, in general, an optimum thickness or limited range of thicknesses for the coating of metal applied if it is to be of good quality—adherent, firm and no-spongy—and if thicker coatings are applied by successive direct applications of the method, an indifferent result is usually achieved, and exfoliation—separation of the successive layers—tends to occur.

Electroless plating, in which the deposition of plating is direct from solution to surface without the need for passage of an electric current, while not so effective as electrolytic plating, has advantages when the surface to be plated is somewhat inaccessible or is to be plated selectively or forms part of an insulator so that electrolytic methods are inapplicable; while evaporation has other disadvantages, including that of cost.

An object of the invention is to lay down a relatively thick coating (of the order of mils, 1 mil being 0.001 inch or about 25 microns) of a first metal (or alloy) on the surface of an insulator (or a semiconductor) such coating consisting of at least 75 percent of said first metal (or alloy) and, according to the invention, this object is achieved by a process of electroless metal plating wherein successive applications of said first metal (or alloy) of optimum thickness (as above defined) are deposited from an electroless plating solution on to an initially metallized surface of said insulator (or semiconductor), interspersed with "flashes" of a second metal of thickness substantially less than that of said first metal (or alloy) deposited from an electroless plating solution and serving to prevent grain growth of said first metal (or alloy) whereby a thick coherent layer of metals is built up containing only a relatively small quantity (e.g. less than 25 percent) of said second metal.

From another aspect, the invention also provides a process for plating a nickel contact or contacts of substantial thickness (of the order of mils, 1 mil being 0.001 inch) on to the exposed surface of a semiconductor element coated with a protective layer of refractory oxide except for one or more specified areas, by a process of electroless nickel plating which includes the steps of:

(a) establishing a basic metallization of the area(s) to be plated by any known method;

(b) plating successive layers of optimum thickness (as herein defined) of nickel from an electroless plating bath of to the said metallized area(s) interspersed with (c) plated layers comprising "flashes" of gold of thickness substantially less than that of the layers of nickel and deposited from an electroless plating bath, whereby a mainly nickel contact area of required thickness containing only a relatively small quantity of gold (e.g. less than 25 percent) may be built up on the or each such exposed area of said semiconductor.

In this process, the purpose of the second metal, for example, gold, applied only as a "flash" of extreme thinness, is to act as a succession of new bases on which to plate the thicker layers of the first metal, e.g. nickel, and to inhibit oxidation of the first metal. Deposits of nickel, for example, made by the electroless method become very rough and granular if attempts are made to build up the required thickness in the conventional "one-shot" manner, i.e. by depositing the required thickness in only one step, or even in a succession of steps without the use of a buffering metal.

By the process now proposed, quite thick layers, up to 0.003 inch (3 mils, or about 75 microns), of nickel-gold sandwich may be made. Provided the nickel is kept clean between stages of the process, the adhesion between nickel and gold is good and no exfoliation occurs.

The invention will be further described with reference to the accompanying drawing illustrating a flow diagram for the process as applied to a silicon "planar" semiconductor slice, together with sections through such a slice of silicon at some of the stages of the process.

Referring now to the drawing, the succession of boxes joined by arrows represents successive stages in the plating process, some of which are repeated in a cyclic process.

The prepared "planar" slice, being a slice of silicon into the surface of which one or more areas of selective impurity have been diffused to form junctions which appear at the surface under a layer of silicon dioxide, is cleaned well in stage 1, so that oxide is removed from the areas that are to be contacted, whilst leaving oxide over the remainder of the surface. A weak fluoride "oxide" etch may be used for this purpose. The section of the slice shown at 1*a* indicates the appearance of the slice at this stage. The junctions are shown dotted, separating the P and N type diffusions from one another and from the basic P+ type material. The dimensions are grossly exaggerated for reasons of clarity, and would be of the order of microns (or tens of microns) for depth of junction and extent of diffused areas, while for the oxide layer, the thickness would be 1 micron or less.

In stage 2, the cleaned slice is immersed in a conventional electroless nickel plating bath, based on the phosphate, so that about 0.2 micron of nickel (not more) is deposited on the exposed silicon areas. This is indicated in FIG. 2*a*.

The slice is then washed (stage 3) and transferred to an oven in stage 4 for sintering in air at 600° C., or preferably nitrogen at 600° C., so as to drive the nickel into the silicon surface as at 4*a*. This is a well-known technique, and ensures good adhesion of the basic layer of nickel to the silicon, and provides the initially metallized surface for subsequent depositions.

After this, the slice is chemically etched (stage 5) to provide a suitably rough surface and is returned, in stage 6, to the nickel plating solution, and a further nickel coating of about 0.2 micron applied. This coating is well adherent and tough, in contrast to the first coating, which tends to be of poor quality. The additional coating is indicated at 6*a*.

This coating is well-washed in stage 7 and passed on to stage 8, where a flash of gold is applied in an electroless gold plating solution, e.g. that sold under the brand name of "Atomex" by Engelhard Industries Limited, which is a cyanide solution working on the replacement process, nickel for gold. This deposits not more than about 0.1 micron of gold on the nickel, and probably very much less. The actual amount is not critical and may be as small as is practicable.

The slice is washed again (stage 9) and transferred to the electroless nickel bath again (stage 10), and at this stage, rather more than 0.2 micron of nickel is deposited. It is not advisable to exceed 0.5 micron because the deposit tends to become "grainy" for excessive thickness. This constitutes an "optimum" range of thicknesses for nickel applied by an electroless process for this purpose.

From this point on, the process is cycled, returning to stage 7 successively and proceeding through stages 8, 9 and 10 until the required thickness of plating has been built up. This plating is mainly nickel, as indicated at 10*a*, the gold being the very minimum necessary to find the successive layers of nickel and prevent oxidation.

It may be observed that the basic layer of nickel, applied in stage 2, may be applied in other ways, e.g. by evaporation; the process thereafter will be as described.

This invention has been described above in terms of nickel plating, but is clearly applicable to electroless plating of any metal or alloy where grain growth during conventional plating presents a problem. Copper is a typical example.

What is claimed is:

1. A process for plating metallic layers on the surface of a semiconductor having an oxide coating comprising:
- cleaning the semiconductor surface to remove the oxide coating from a selected area;
- depositing on the surface a first layer of nickel;
- sintering the semiconductor and said first layer;
- etching to roughen the surface of the first layer;
- electroless plating a second layer of nickel on said first layer;
- electroless plating a thin first layer of gold on said second layer;
- electroless plating a layer of nickel on said gold layer thicker than said gold layer; and
- repetitively plating thin layers of gold interspersed with thick layers of nickel to attain a predetermined plating thickness.

2. A process for plating metallic layers on the surface of a semiconductor having an oxide coating comprising:
- cleaning the semiconductor surface to remove the oxide coating from a selected area;
- depositing on the surface a first layer of nickel;
- washing the first layer;
- sintering the semiconductor and first layer to cause adhesion to the surface;
- etching to roughen the surface of the first layer;
- depositing a second layer of nickel on said first layer from an electroless plating solution;
- washing the second layer;
- depositing a first layer of gold on said second layer from an electroless plating solution to inhibit oxidation of the first metal;
- washing the layer of gold;
- depositing a thick layer of nickel on said gold layer from an electroless plating solution without the occurrence of graininess; and
- repetitively washing the thick layer of nickel, depositing said thin layer of gold, washing said thin layer of gold and depositing said thick layer of nickel to provide a plurality of interspersed nickel and gold layers until a predetermined plating thickness is attained.

3. The process of claim 2 wherein the gold is deposited to form less than twenty-five percent of the entire plating thickness.

4. The process of claim 3 wherein the first layer of nickel is deposited from an electroless plating solution.

5. The process of claim 3 wherein the semiconductor surface is cleaned with a weak fluoride oxide etching solution.

6. The process of claim 3 wherein the first layer of nickel is deposited to a thickness of not more than about .2 micron, the other layers of nickel being deposited to between .2 and .5 micron and the layers of gold being not more than about .1 micron.

7. The process of claim 6 wherein said first layer of nickel is sintered in air at about 600° C.

8. The process of claim 6 wherein said first first layer of nickel is sintered in nitrogen at about 600° C.

9. A semiconductor device comprising:
- a body of semiconductor material having an oxide coating on the surface thereof, selected portions of said coating being removed to expose the semiconductor surface;
- a first thick layer of a nickel on said exposed surface;
- a second thin layer of gold on said first layer; and
- a plurality of interspersed thick layers of nickel and thin layers of gold thereon, said layers having a predetermined total thickness.

10. The device of claim 9 wherein the gold forms less than twenty-five percent of the total thickness.

11. The device of claim 10 wherein the thick layers of nickel are between .2 and .5 micron and the thin layers of gold are not more than .1 micron.

References Cited

UNITED STATES PATENTS

| | | | |
|---|---|---|---|
| 2,962,394 | 11/1960 | Andres | 117—217 X |
| 2,995,473 | 8/1961 | Levi | 117—217 X |
| 3,238,062 | 3/1966 | Sonners et al. | 117—212 X |
| 3,253,320 | 5/1966 | Levi-Lamond | 117—212 X |

OTHER REFERENCES

Leonard Fox: "Gold Plating Semiconductive Silicon Body," RCA Technical Notes #366, June 1960.

"Science for Electroplaters," Metal Finishing, pages 73–74, August 1966.

ALFRED L. LEAVITT, *Primary Examiner.*

A. M. GRIMALDI, *Assistant Examiner.*